Aug. 12, 1958

A. RAIZK ET AL 2,846,754

SCRAP METAL BREAKER

Filed July 7, 1955

Inventors:
Alexander Raizk
Lincoln Raizk
By Warren D. Horton
Atty.

United States Patent Office
2,846,754
Patented Aug. 12, 1958

2,846,754

SCRAP METAL BREAKER

Alexander Raizk and Lincoln Raizk, Wilmington, Ohio

Application July 7, 1955, Serial No. 520,542

4 Claims. (Cl. 29—66)

Our invention relates to a scrap breaker and, more specifically, to a device for breaking up metal scrap for reuse.

Commonly, foundry scrap, or ferrous metal scrap generally, is broken up by the use of "skull crackers"; large steel balls which are elevated a substantial distance above the wrecking floor by a crane or its equivalent and permitted to fall on the scrap.

It is inherent in such procedure that the point of impact of the skull cracker on the scrap cannot be exactly determined. It follows that the provision of any bridge type of support for the scrap to facilitate breaking would be idle because the breaker might as easily hit the scrap directly over one of the anvil supports as between the anvil supports, or may indeed hit the scrap away from the support to flip it dangerously about the breaking area. Therefore, the scrap is usually placed directly on the ground or other flat surface. This, however, gives rise to a further difficulty in that there is an undesirable small fragmentation or pulverization of a good portion of the scrap. The same situation would of course be true in the case of an anvil supported scrap item wherein the breaker were to land on the item directly over the anvil.

Our invention is directed to the provision of a scrap breaker wherein the point of impact of the breaker may be exactly determined and the scrap therefore placed and supported to receive a blow of maximum efficiency both from the point of view of insuring that the scrap is broken as desired and also avoiding excessively small fragmentation of the scrap.

Another object of our invention is the provision of such a device which is simple, fool-proof, inexpensive, and exceedingly easily constructed.

Still another object is the provision of such a device which may be operated by facilities existing in most plants and certainly on any ordinary breaking floor.

Other objects and advantages of our invention will be apparent from the following description and drawings, of which:

Figure 1:
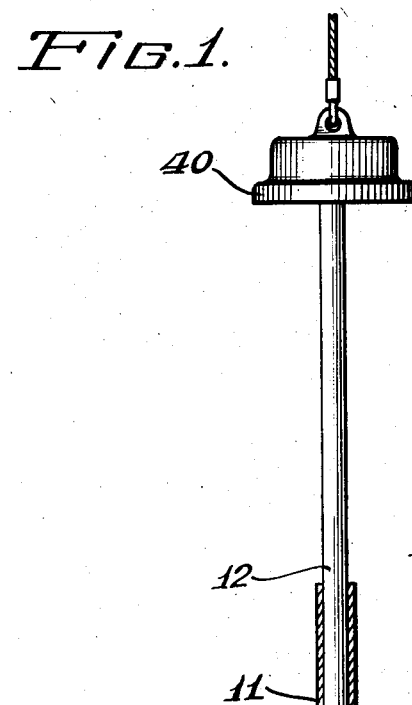
Fig. 1 is a central sectional elevation of a breaker incorporating our invention.
Figure 2:
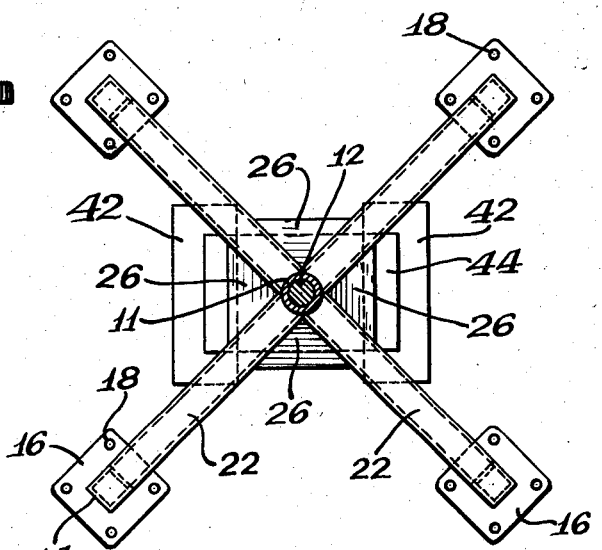
Fig. 2 is a plan of the base of the breaker and may be regarded as being taken substantially along the line 2—2 of Fig. 1, looking in the direction of the arrows; and, Fig. 3 is an enlarged view of the lower end of the dropping bar of our invention shown partly in section.
Figure 3:
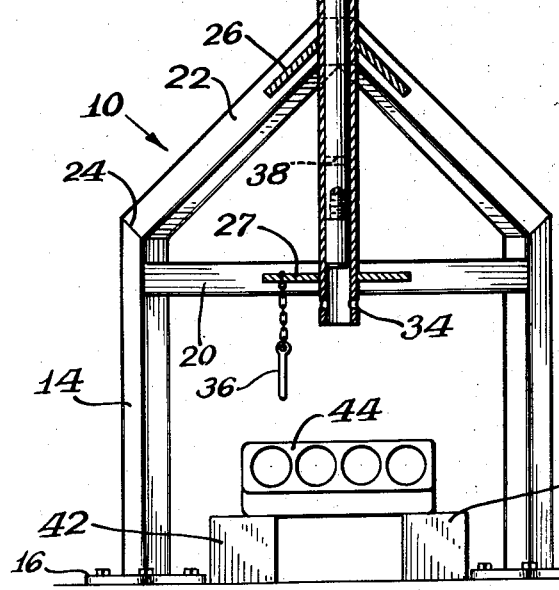
Figure 3:
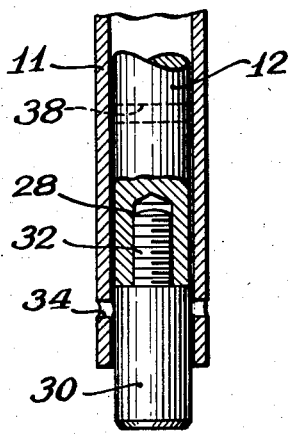

The illustrated embodiment of our invention consists generally of a standard 10, guide 11, and a dropping bar 12.

The specific application illustrated is shown in connection with breaking up automobile engine cylinder blocks. The particular proportions and sizes described hereafter will relate to an assembly suitable to this purpose. It will be readily understood, however, that the sizes and proportions may vary widely depending on their contemplated use.

The guide 11 may consist of a length of heavy pipe. In the illustrated structure, we find a length of about twelve feet appropriate. The pipe is supported vertically and spaced a suitable distance above the ground or floor by a very rigid and strong support structure 10. The support structure may consist of four well-spaced legs 14 of box section steel. The legs 14 have feet 16 secured to the bottom thereof by which the breaker may be secured by bolts 18 to the working floor. Toward upper ends of the legs 14, horizontal braces 20 extend between and are welded to the legs 14 and the guide 11. Inclined braces 22 are welded at their lower ends 24 to the very top of the legs 14 and extend upwardly and inwardly to be welded to the guide 11 substantially above the attachment point of the horizontal braces 20 thereto. Gussets 26 and 27 extend respectively between the inclined braces 22 and between the horizontal braces 20 to impart additional strength to the structure.

Other bracing may be provided as needed to meet the requirements of the particular design and the breaking job to be accomplished.

The hammer or dropping bar 12 is simply a steel cylinder which should fit closely within the guide 11, but be freely slidable therein. Illustratively, the dropping bar may weigh about seven hundred pounds and should be long enough to extend from the lowest possible end point of travel, i. e., the working floor, to a point somewhat above the upper end of the guide 11. The lower end of the dropping bar may have an axial threaded bore 28 therein, and a hardened steel head 30 may be attached to the lower end of the bar by a threaded stud 32 extending therefrom. The purpose served by the replaceable head, of course, is to provide a surface which is better able to stand the impacts delivered by the dropping bar 12 than the soft steel of which the dropping bar would be made, and also which may be easily replaced or removed for grinding when the end is sufficiently distorted or mushroomed by the impacts to interfere with the travel of the bar 12 through the guide 11.

The guide should have a pair of holes 34 on opposite sides thereof adjacent the lower end, and a pin 36 may be fixed on a chain to an adjacent portion of the standard. When it is desired to anchor the dropping bar in an upper position, the bar may be raised, the pin inserted in the holes to span the guide, and the falling bar lowered on the pin. It is also desirable that the falling bar itself have a bore 38 therethrough for purposes of removing the head 30. In this case, the dropping bar is lowered until the bore 38 registers with the holes 34 and the pin is then inserted through the holes 34 and the bore 38, supporting the head below the lower end of the guide 11. The pin 36 serves to anchor the dropping bar 12 against rotation as torque is applied to loosen the head 30.

Magnetic cranes are common devices on breaking floors. They provide the most convenient and efficient gathering and handling mechanism for ferrous scrap. Our device is intended for use with such a crane and to be operated thereby. In Fig. 1 appears the magnet 40 of a magnetic crane.

Our device is completed by anvil blocks 42 positioned on the breaking floor to support the metal to be broken to recieve the most efficient blow. It will be understood of course that our device is entirely capable of breaking metal directly on the floor, but the particular and major advantages of our device appear most strikingly when anvil blocks are used. As stated above, the device of our invention has the advantage of delivering a blow at a precisely located point. It is this accuracy of impact which makes anvil support feasible and desirable. The anvil blocks may simply be blocks of steel of any desired conformation to support the metal to be broken in the fashion most apt to lead to the desired fracture.

The operation of our device needs no elaboration. The structure having been erected within reach of a magnetic crane, a cylinder block 44 is placed on the anvil blocks 42. The widespread legs and the open nature of the support makes such placement easy. During this placement, the dropping bar 12 may be supported in a raised position by either the magnetic crane or the pin 36 through holes 34. The magnetic crane then raises the dropping bar 12 to the extent necessary and releases it to permit it to fall on the cylinder block. It will hit the cylinder block at a predictable point between its supported ends and break it cleanly with less impact force than would be the case if the block were simply placed directly on the breaking floor, and at the same time, avoids the pulverization of the metal of the block which would result from a flat support therefore.

The length of the dropping bar 12 is such that even though the hammer 30 falls through the cylinder block to the breaking floor, the end of the bar still stands above the level of the guide 11. Therefore, when the magnet 40 is lowered to pick up the bar for another breaking operation, the dropping bar only is seized by the magnet, and the guide structure stands well below the field developed by the magnet.

We have illustrated our device as being applied to the breaking of cylinder blocks. It is suitable for many other sorts of breaking operations. We have found, for instance, that railroad rails, if preliminarily notched, can be readily broken by the illustrated structure.

Different breaking jobs may call for differing details of structure, and even for the same job, there will be many alternative structural embodiments of our invention. For example, the dropping bar may be raised and tripped by gearing and a motor of one kind or another rather than by use of a magnetic crane. Likewise, the base may be provided with tripod legs or other legs instead of the four-legged support as specifically shown. The anchoring means for the base may be of such type as to be readily removed and render the mechanism readily portable from place to place. We therefore desire that our invention be regarded as being limited only as set forth in the following claims.

We claim:

1. A scrap metal breaker comprising a stationary, free-standing guide including a tubular guide sleeve and leg structure extending outwardly and downwardly from said sleeve to support said sleeve vertically and above a breaking floor, a cylindrical dropping bar slidably contained in said sleeve, said dropping bar having a length greater than the distance of the upper end of said sleeve above said floor, and a mobile electro-magnetic crane having an electromagnet movable over the dropping bar and engageable with the top surface of said dropping bar to raise said dropping bar and to release said bar for a scrap breaking free fall within said guide.

2. The combination as set forth in claim 1 including additionally a cross pin removably contained in said sleeve adjacent the lower end thereof and traversing the interior thereof to support said dropping bar in an elevated position.

3. The combination as set forth in claim 1 including additionally means for securing the lower ends of said legs to said floor to direct the fall of said dropping on a predetermined line and a pair of anvils positioned on said floor on either side of said line to support the scrap to be broken in said line and above said floor.

4. On a scrap metal breaking floor including a mobile electro-magnetic crane, a scrap metal breaker comprising a stationary, free-standing guide which includes a tubular guide sleeve and braced leg structure secured to said floor and supporting said sleeve vertically and over a predetermined point on said floor, and a dropping bar having a length greater than the distance of the upper end of said sleeve above said floor slidably contained within said sleeve, the upper surface of said dropping bar being engageable by said crane to be raised thereby and released therefrom for a scrap breaking free fall on a vertical line toward said point.

References Cited in the file of this patent

UNITED STATES PATENTS

| | | |
|---|---|---|
| 289,738 | Weidersheim | Dec. 4, 1883 |
| 839,246 | Williams | Dec. 25, 1906 |
| 1,097,105 | McGregor | May 19, 1914 |
| 1,154,734 | Slick | Sept. 28, 1915 |
| 1,703,127 | Vial | Feb. 26, 1929 |
| 2,125,651 | Rosen | Aug. 2, 1938 |
| 2,135,404 | Lofstrand, Sr. | Nov. 1, 1938 |
| 2,137,191 | Legg | Nov. 15, 1938 |
| 2,178,797 | La Vigne | Nov. 7, 1939 |
| 2,248,108 | Michalko | July 8, 1941 |
| 2,293,341 | Hoiby | Aug. 18, 1942 |
| 2,680,282 | Each | June 8, 1954 |
| 2,723,803 | Cornett | Nov. 15, 1955 |

FOREIGN PATENTS

| | | |
|---|---|---|
| 69,661 | Germany | July 13, 1893 |
| 171,677 | Great Britain | 1923 |
| 324,257 | Germany | Aug. 23, 1920 |
| 879,226 | Germany | July 11, 1953 |